Mar. 27, 1923.
J. E. McFARLAND
SIGNALING DEVICE
Filed Feb. 25, 1922
1,449,950
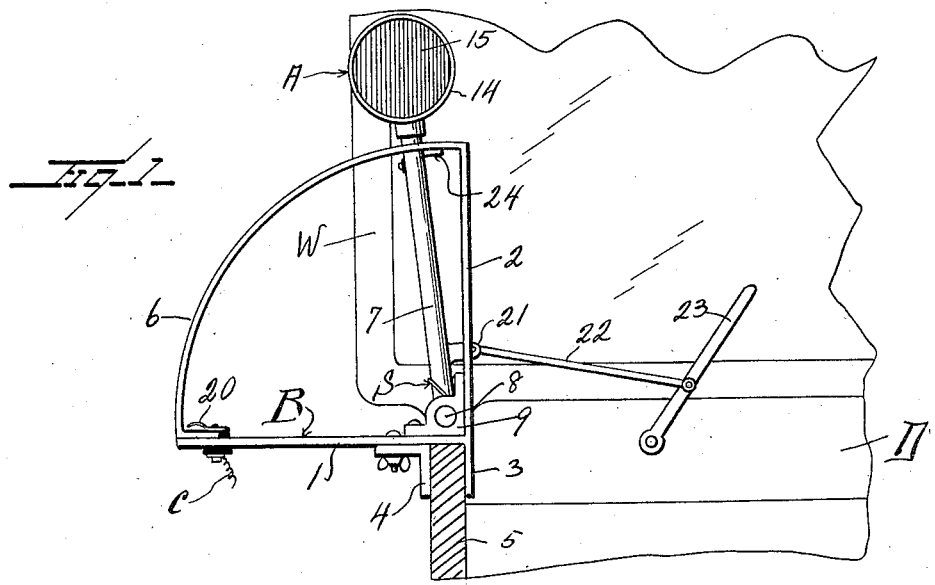
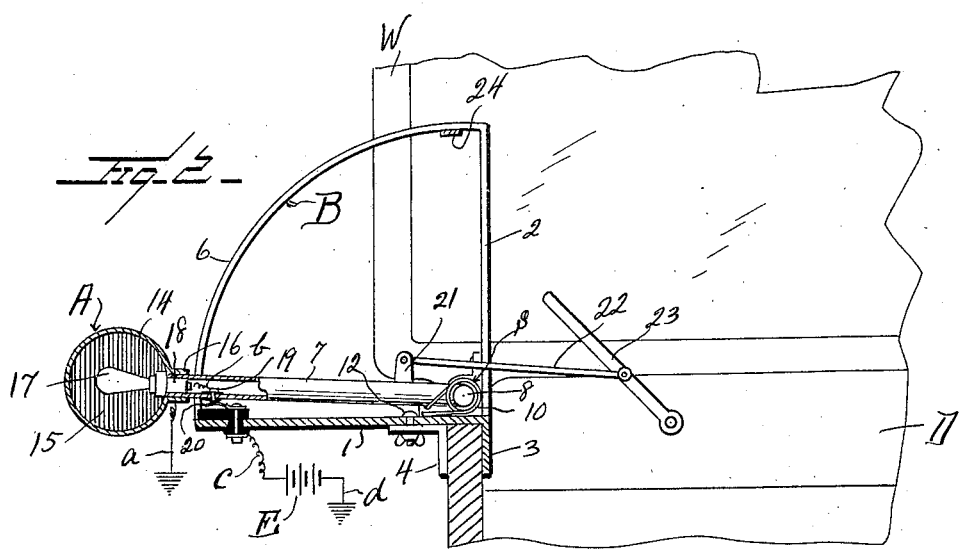
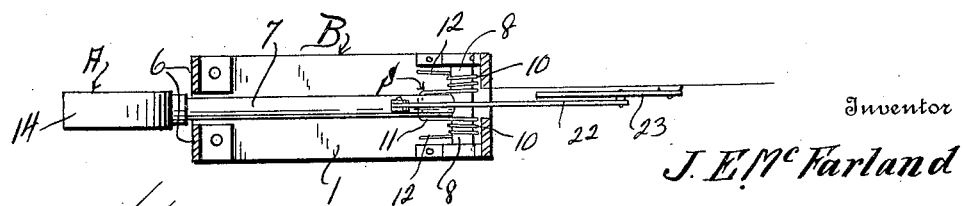
Inventor
J. E. McFarland
By Watson E. Coleman
Attorney Patented Mar. 27, 1923.

1,449,950

UNITED STATES PATENT OFFICE.

JOSEPH E. McFARLAND, OF WEST DURHAM, NORTH CAROLINA, ASSIGNOR OF ONE-HALF TO GEORGE H. BEALL, OF DURHAM, NORTH CAROLINA.

SIGNALING DEVICE.

Application filed February 25, 1922. Serial No. 539,199.

*To all whom it may concern:*

Be it known that I, JOSEPH E. McFARLAND, a citizen of the United States, residing at West Durham, in the county of Durham and State of North Carolina, have invented certain new and useful Improvements in Signaling Devices, of which the following is a specification, reference being had to the accompanying drawings.

This invention relates to certain improvements in signaling devices and has relation more particularly to a device of this general character especially designed and adapted for use in connection with an automobile or kindred vehicle to give notice fore and aft of the vehicle that a stop is to be made, and it is an object of the invention to provide a device of this general character embodying novel and improved means whereby the signal is normally maintained inoperative yet can be readily and conveniently rendered operative by the driver or other occupant of the vehicle.

Another object of the invention is to provide a novel and improved device of this general character embodying a semaphore or arm supported by a bracket for swinging movement in a substantially fixed path of travel, together with means for normally maintaining the semaphore or arm in an inoperative position, and manually operated means for moving said semaphore or arm into an operative position.

The invention consists in the details of construction and in the combination and arrangement of the several parts of my improved signaling device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation of a signal constructed in accordance with an embodiment of my invention and in applied position, the coacting portion of an automobile being shown in fragment;

Figure 2 is a view similar to Figure 1 with the semaphore or arm in a second position, the circuit for an illuminating member carried by said semaphore or arm being diagrammatically indicated; and Figure 3 is a view partly in horizontal section and partly in top plan of my improved signal as herein embodied.

As disclosed in the accompanying drawings, B denotes a bracket comprising two substantially perpendicularly related arms 1 and 2, the arm 1, when the device is applied, being horizontally disposed and extending outwardly from the body of an automobile or kindred vehicle, with the arm 2 vertically disposed. The arm 2 is provided with an extension or supplemental arm 3 depending below the arm 1 while the arm 1 outwardly of the extension or supplemental arm 3 is provided with a clamping member 4. The clamping member 4 and the extension or supplemental arm 3 coact with the side wall 5 of a vehicle body or the like to maintain the bracket B in applied position and preferably at a point in close proximity to the windshield W.

The extremities of the arms 1 and 2 are connected by the spaced arcuate arms 6 between which is disposed the outer end portion of an arm 7. The inner end portion of the arm 7 is provided with the oppositely disposed trunnions 8 which fit within the bearings 9 positioned immediately adjacent the conjunction between the arms 1 and 2 and whereby the arm 7 is supported for swinging movement in a vertical direction.

A spring S is coiled, as at 10, around each of the trunnions 8 and has its intermediate portion formed with a forwardly disposed extension 11 which underlies and contacts with the arm 7. The free extremities of the spring S are extended as at 12, and have contact with the arm 1. By this arrangement, the spring S operates to constantly urge the arm 7 in an upward direction.

Secured to the outer end portion of the arm 7 and outwardly of the bracket B is a semaphore A which comprises a cylindrical casing 14 and the side plates 15 of glass or other transparent material, said plates being preferably red in color. The casing 14 is suitably secured, as at 16, to the outer end of the arm 7.

Extending within the semaphore A is an illuminating member 17, preferably an incandescent bulb, and which is suitably engaged within the socket member 18 held within the outer end portion of the arm 7 and for which reason the arm 7 is preferably hollow throughout the major portion of its length. The shell or one contact member of the socket 16 is grounded, as at $a$, while the second contact of the socket is in electrical connection through the conductor $b$ with the contact member 19 which extends through a wall of the arm 7.

The outer end portion of the arm 1 of the bracket B has secured thereto but insulated therefrom a spring contact member 20 in electrical connection through the conductor $c$ with a suitable source of electrical energy E and which source is also grounded through the conductor $d$. When the arm 7 is moved outwardly to extend the semaphore A into working position, the contact 19 will engage the contact 20, thereby closing the circuit for the illuminating member 17 and which is particularly desirable after nightfall. Although not shown, it is to be understood that a suitable switch may be interposed in one of the conductors of the circuit for the member 17 so that said circuit may be maintained open when desired.

Extending laterally from the lower or inner portion of the arm 7 is a lug or finger 21 with which is pivotally engaged an end portion of a lever 22. The lever 22 extends inwardly of the body of the vehicle and is pivotally engaged with an upstanding lever 23. This lever 23 is preferably supported for swinging movement by the dash D of the vehicle.

As before stated, the arm 7 is normally maintained in its elevated or inoperative position through the instrumentality of the spring S. When it is desired to give warning both fore and aft of the vehicle that a stop is to be made, the driver or other occupant of the car swings the lever 23 outwardly which results in the arm 7 moving downwardly and thereby bringing the semaphore A into an extended or operative position. Upon release of the lever 23, the spring S will operate automatically to return the arm 7 to its raised or inoperative position.

The upper end portions of the arms 6 are connected by a cross member 24 which serves to limit the upward swinging movement of the arm 7.

From the foregoing description it is thought to be obvious that a signaling device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A signal of the class described comprising, in combination, a bracket, means carried by the bracket for securing the same in applied position, spaced bearings carried by the bracket, an arm having an end portion provided with oppositely disposed trunnions engaged with the bearings, said bracket including spaced arms between which the opposite end portion of the first named arm extends, a spring coiled around the trunnions of the first named arm and having its intermediate portion provided with an extension bridging said first named arm, the extremities of the spring having contact with the bracket, said spring operating to automatically swing the first named arm in one direction, means for moving said first named arm in the opposite direction, and signaling means carried by said first named arm.

In testimony whereof I hereunto affix my signature.

JOSEPH E. McFARLAND.